United States Patent [19]

Campbell et al.

[11] Patent Number: 5,265,762
[45] Date of Patent: * Nov. 30, 1993

[54] PUNCTURING DEVICE FOR AEROSOL CONTAINERS

[75] Inventors: Michael C. Campbell, 1400 N. Woodhouse Rd., Virginia Beach, Va. 23454; Katherine C. Campbell, Virginia Beach, Va.

[73] Assignee: Michael C. Campbell, Virginia Beach, Va.

[*] Notice: The portion of the term of this patent subsequent to Nov. 17, 2009 has been disclaimed.

[21] Appl. No.: 861,326

[22] Filed: Mar. 31, 1992

Related U.S. Application Data

[63] Continuation-in-part of Ser. No. 687,760, Apr. 19, 1991, Pat. No. 5,163,585.

[51] Int. Cl.[5] ................................................. B67B 7/00
[52] U.S. Cl. .................................... 222/5; 414/412; 141/65; 141/329; 30/448; 222/83.5
[58] Field of Search ....................... 222/4, 5, 80-89; 141/65, 329, 330, 51, 66; 414/412; 30/366, 448

[56] References Cited

U.S. PATENT DOCUMENTS

| | | | |
|---|---|---|---|
| 3,169,665 | 2/1965 | Colley | 222/5 |
| 3,303,968 | 2/1967 | Compère | 222/82 |
| 3,333,735 | 8/1967 | Odasso | 222/5 |
| 3,358,883 | 12/1967 | Loe | 222/86 |
| 3,438,548 | 4/1969 | Ceyba | 222/80 |
| 3,828,976 | 8/1974 | Sidelinker | 222/83.5 |
| 3,834,589 | 9/1974 | Morane et al. | 222/86 |
| 3,926,340 | 12/1975 | Tygenhof | 222/83.5 |
| 4,349,054 | 9/1982 | Chipman et al. | 141/1 |
| 4,407,341 | 10/1983 | Feldt et al. | 141/97 |
| 4,459,906 | 7/1984 | Cound et al. | 100/45 |
| 4,500,015 | 2/1985 | Penney | 222/83.5 |
| 4,580,700 | 4/1986 | Rush | 222/83.5 |
| 4,934,055 | 6/1990 | Chambers | 30/366 |
| 5,067,529 | 11/1991 | Gonzalez-Miller et al. | 141/7 |
| 5,114,043 | 5/1992 | Collins | 222/86 |

FOREIGN PATENT DOCUMENTS

| | | |
|---|---|---|
| 1607991 | 10/1970 | Fed. Rep. of Germany . |
| 616328 | 1/1927 | France . |
| 821399 | 4/1981 | U.S.S.R. . |

*Primary Examiner*—Andres Kashnikow
*Assistant Examiner*—Kenneth DeRosa
*Attorney, Agent, or Firm*—Griffin Butler Whisenhunt & Kurtossy

[57] ABSTRACT

A puncturing device (10) for pressurized containers (12) comprises an elongated housing member (16) defining an elongated cavity (24) with openings (26, 28) at first and second ends (30, 32) thereof for receiving an inverted pressurized container at the first end, the housing member including a selective attachment member (36) for securing the second end of the housing member to a collection receptacle (38). A non-sparking puncturing apparatus (18), with a lever (44) having a built-in stop (48, 50), is movably mounted on the housing member with a pivot-link (54)-driven puncture pin (56) extending through an intermediate aperture (34) into the cavity for piercing a nozzle-end of the pressurized container below an internal shoulder (40) thereof with a seal (42). Thus, gases and residual contents are released into the receptacle through the opening in the second end. An auxiliary support member (22) is rotatably mounted on the housing member for stabilizing relative movement between the housing member and the receptacle. A force-applying apparatus (20) is mounted on the housing member for engaging the pressurized container and holding it on the seal.

26 Claims, 4 Drawing Sheets

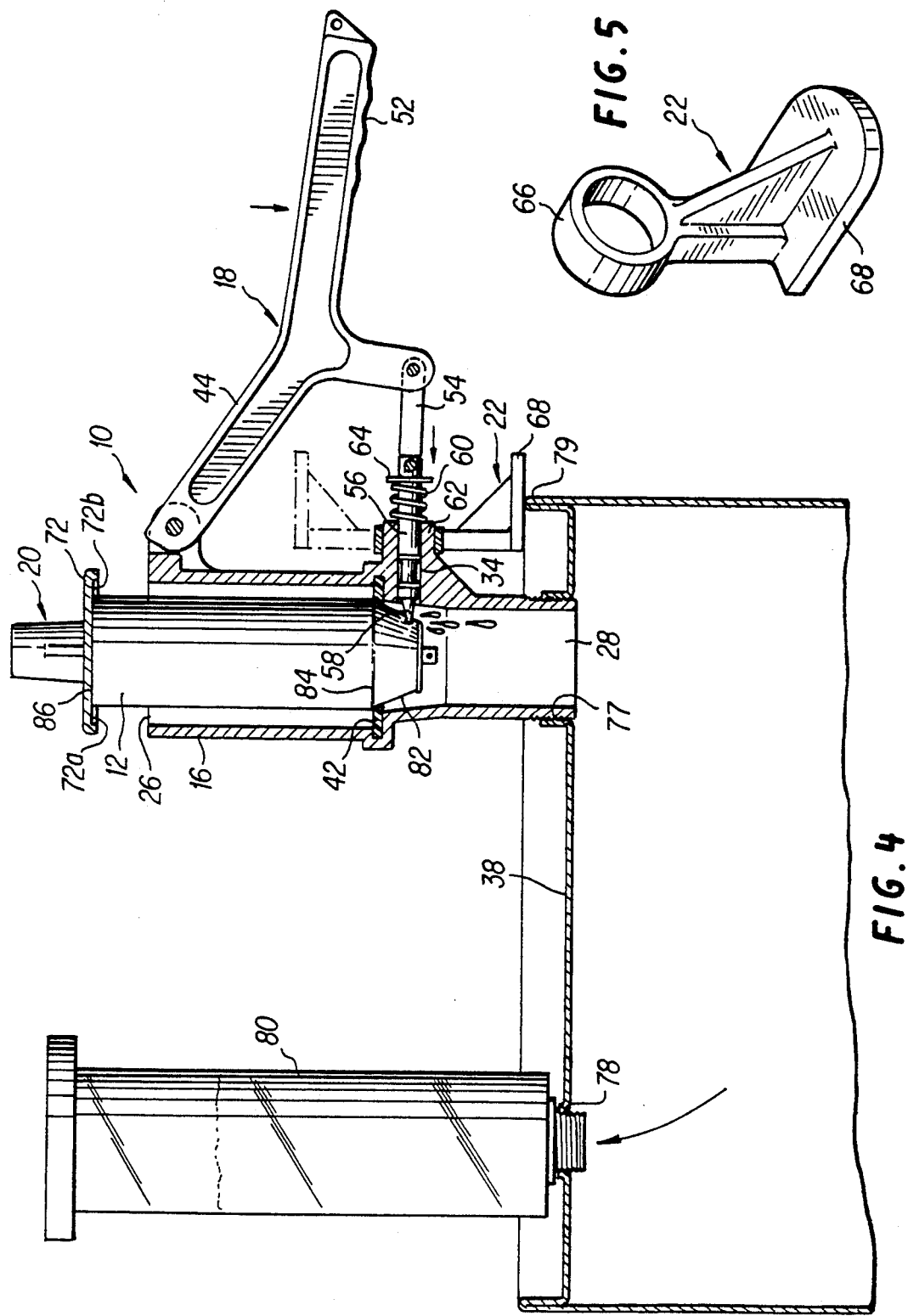

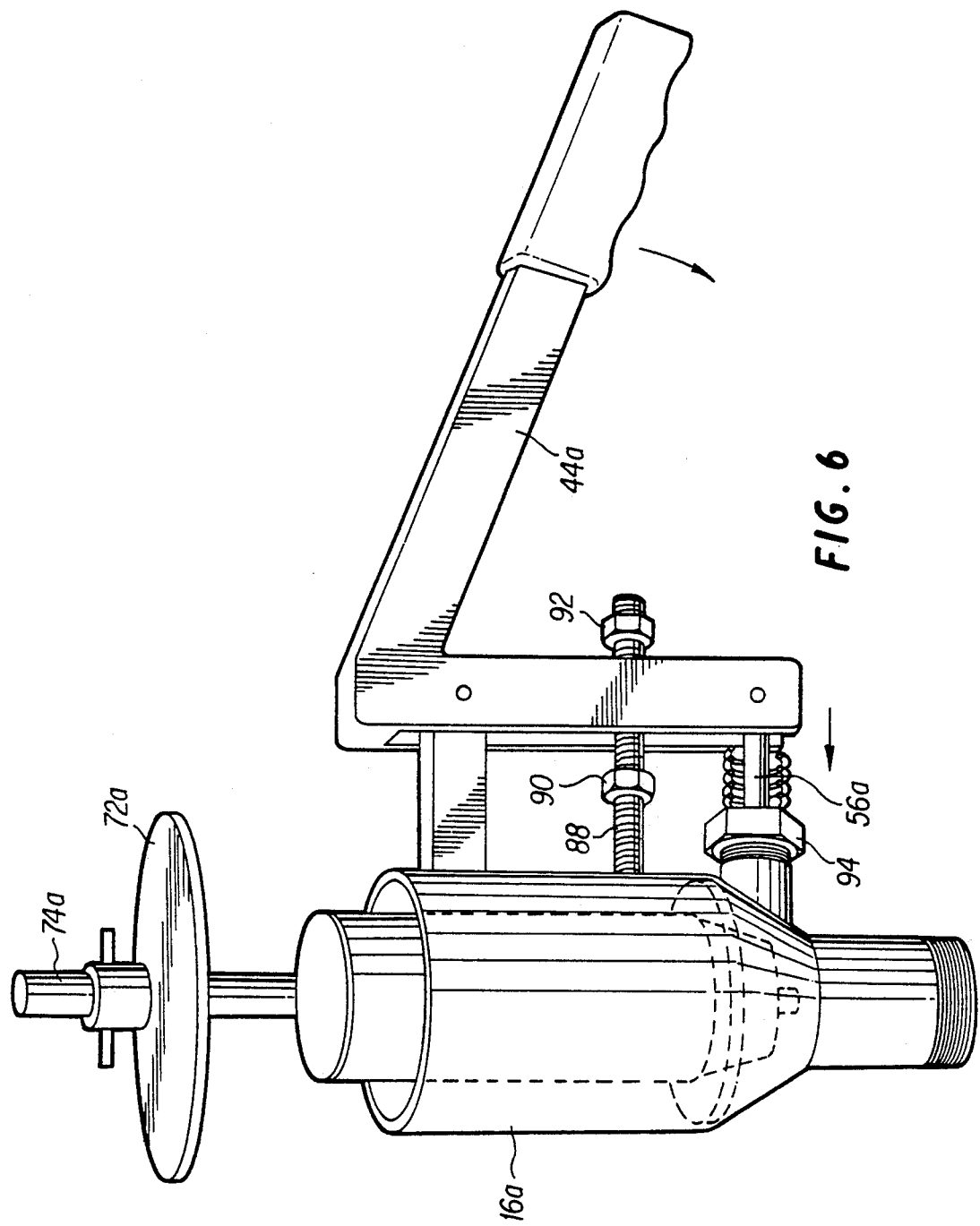

PUNCTURING DEVICE FOR AEROSOL CONTAINERS

This is a continuation-in-part application of Ser. No. 07/687,760 filed Apr. 19, 1991 now U.S. Pat. No. 5,163,585.

BACKGROUND OF THE INVENTION

This invention relates generally to the art of waste disposal, and more specifically to devices for relieving aerosol cans of pressure and emptying them of residual contents in preparation for disposing or recycling them.

Pressurized aerosol cans, and other pressurized containers, have widespread usage in homes and industry. It has long been recognized that disposing of such containers constitutes a safety hazard in that exposure to excessive external heat and/or pressure can cause them to explode if they have not been relieved of internal pressure.

In addition, it has long been recognized that disposing of such containers often constitutes an environmental hazard because of their dangerous contents.

Due to these hazards, the Environmental Protection Agency (EPA), an agency of the US government, regulates disposal of pressurized containers as well as their contents. These regulations mandate that certain businesses and industries must puncture all pressurized containers prior to their disposal. Further, these regulations require that certain contents of the pressurized containers be captured and disposed of in particular manners. Depending upon the nature of the contents, such disposal methods can involve permanent disposal through incineration, landfills or other means; treatment and permanent disposal; treatment and recycling; and treatment and reclamation for a new use. An example of reclamation would be recovering a solvent contained in waste paint for use as a fuel. But again, whichever disposal method is used, the EPA requires many industries to relieve the pressures in all pressurized containers prior to transporting them for disposal.

Further, while EPA regulations do not apply to individuals and many small businesses, many of these still desire to dispose of hazardous contents of such containers, and the containers themselves, in a manner which provides personal safety and protects the environment, and would do so if a reliable, inexpensive apparatus therefor exists.

There have been a number of prior-art devices suggested for piercing pressurized containers such as are described in U.S. Pat. No. 3,303,968 to Compere; U.S. Pat. No. 3,333,735 to Odasso; U.S. Pat. No. 3,828,976 to Sidelinker; U.S. Pat. No. 3,926,340 to Tygenhof; U.S. Pat. No. 4,500,015 to Penney, and U.S. Pat. No. 4,934,055 to Chambers. Some of these devices do not adequately provide for disposal of gases and residual contents of the pressurized containers, such as the devices of Compere, Sidelinker, Odasso, Tygenhof and Penney.

The device of Chambers (U.S. Pat. No. 4,934,055) does provide for disposal of contents of pressurized cans, however, this device appears to be somewhat limited in application having an unduly small, custom-built, reservoir and apparently requiring an undue amount of strength and dexterity to operate. Also, the device of this patent does not appear to be sufficiently durable to withstand repeated use.

Although U.S. Pat. No. 4,349,054 to Chipman et al. does provide for disposal of contents, not all of the contents will be evacuated, and the device of this patent is unduly large, complicated, and expensive.

Additional patent documents disclosing devices for puncturing pressurized cans and/or disposing of their contents include U.S. Pat. No. 5,067,529 to Gonzalez-Miller et al., U.S. Pat. No. 4,459,906 to Cound et al., and U.S. Pat. No. 4,407,341 to Feldt et al. as well as Soviet patent document 821399 and German Offenlegungsschrift 1,607,991. All of these patent documents disclose relatively complicated, expensive, and large machines.

Thus, it is an object of this invention to provide a device for puncturing a pressurized container to relieve the pressure therein and for releasing gases and residual contents thereof into a collection receptacle which is not unduly complicated, which can be easily transported to a site and installed thereat, which is relatively easy and convenient to use requiring no outside power, which can be used with off-the-shelf receptacles in common us, which is relatively inexpensive to manufacture, which operates in a manner complying with EPA regulations in a safe and efficient manner, and which can accommodate pressurized containers of various sizes.

It is yet another object of this invention to render aerosol cans recyclable as scrap metal in safe condition for handling, with no shredded metal shards or sharp protrusions.

SUMMARY OF THE INVENTION

According to principles of this invention, a device for puncturing a pressurized container for relieving the pressure therein and for releasing the gases and residual contents thereof into a collection receptacle comprises an elongated housing member defining an elongated cavity with first and second openings at first and second ends thereof for receiving an inverted pressurized container in the first opening, the housing member having an intermediate aperture into the elongated cavity intermediate the first and second ends, the housing member including an attachment member for securing the second end of the housing member to a receptacle for collecting contents expelled from the second end when a puncturing member, which is movably mounted on the housing member, extends through the intermediate aperture and pierces a pressurized container in the cavity. The housing member defines an internal shoulder between the first end and the intermediate aperture for engaging the pressurized container with an inverted nozzle-end thereof extending beyond the shoulder being pierced by the puncturing apparatus, the nozzle-end forming a funnel shape to thereafter maximize evacuation of residual liquids. A seal is included on the shoulder for forming a seal between the housing member and the pressurized container.

An auxiliary support member extends from the housing member to the receptacle for preventing relative movement between the housing member and the receptacle during operation of the device.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 4 is a side, partially cross-sectional view of the device of FIG. 1 mounted on an off-the-shelf-barrel or drum with a filtered outlet;

FIG. 5 is an isometric view of an auxiliary support member which is part of the device of FIG. 1; and FIG. 6 is an isometric view of an alternate embodiment of this invention.

DESCRIPTION OF A PREFERRED EMBODIMENT

Figure 1:
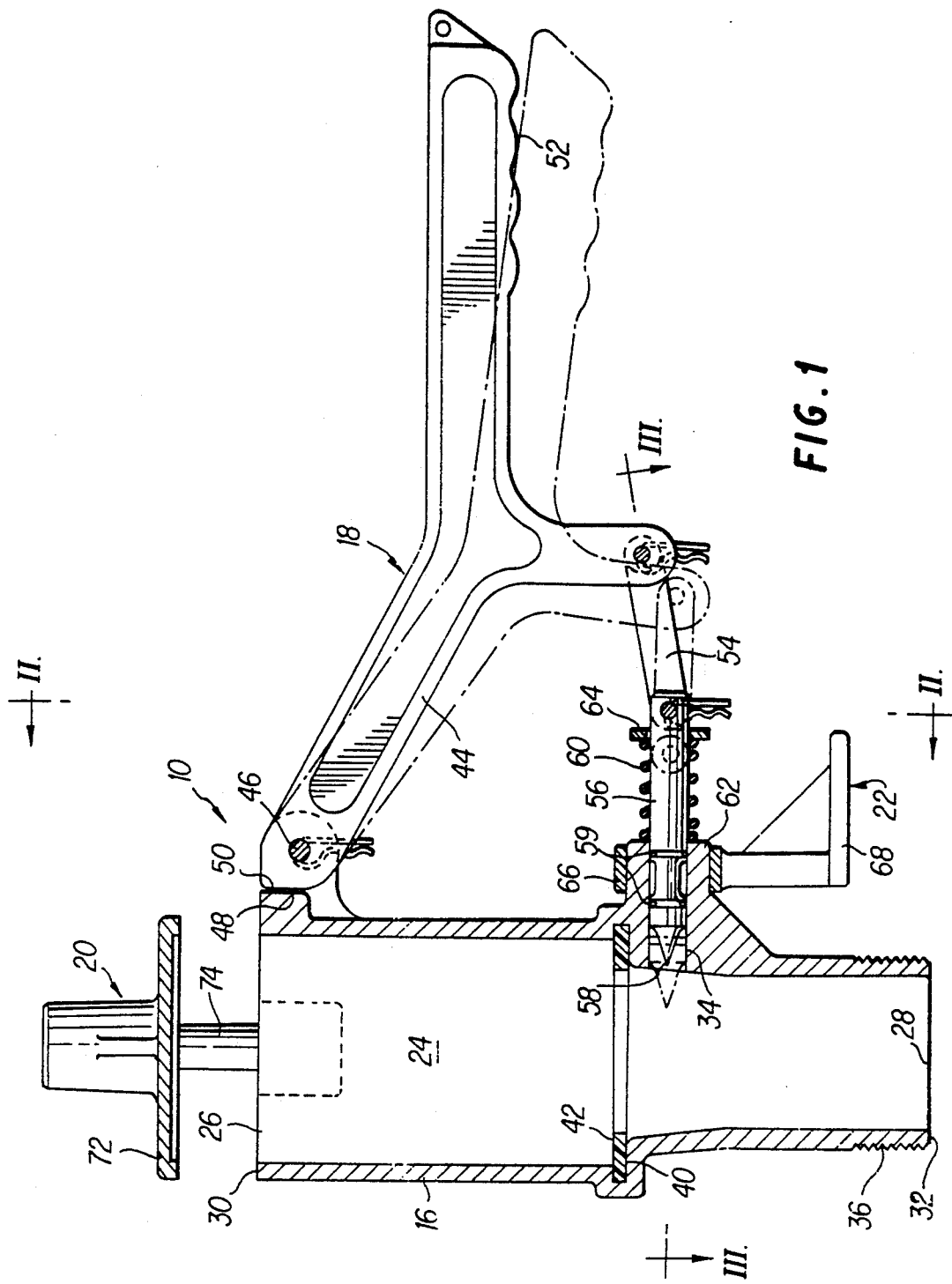
FIG. 1 is a side, partially cross-sectional, view of a first-embodiment device of this invention.

A device 10 for puncturing a pressurized container 12 for relieving the pressure therein and for releasing into a collection container or receptacle 14 the gases and residual contents thereof generally comprises an elongated housing member 16, puncturing apparatus 18, force-applying apparatus 20, and an auxiliary support member 22.

The generally elongated housing member 16 defines an elongated cavity 24 with first and second openings 26 and 28 at first and second ends 30 and 32 thereof. The elongated housing member 16 has an intermediate aperture 34 extending from outside the elongated housing member 16 into the elongated cavity 24 positioned intermediate the first and second open ends 30 and 32. The elongated housing member further includes a threaded terminus 36, with male threads thereon near the second end 32 which is dimensioned, and which has a thread pitch, for selectively engaging and disengaging a female threaded bung of a standard off-the-shelf 5 gal., 20 gal., 30 gal., 55 gal. drum 38 and others (although other embodiments can be sized and threaded to fit other collection containers or receptacles). In this regard, the standard off-the-shelf drums mentioned above all have 2 inch filling or spout bung holes with standard threads as well as ¾ inch venting bung holes, also with standard threads. Similarly, drums meeting standards of other countries also usually have large and small threaded bung holes.

As can be seen in FIG. 1, the elongated housing member 16 defines an internal shoulder 40 therein immediately above the intermediate aperture 34, between the intermediate aperture 34 and the first end 30, such that the elongated cavity 24 has a relatively uniform cross-sectional area (about 2⅛ inch in diameter in one embodiment) from the first end 30 to the shoulder 40 but thereafter has a reduced cross-sectional area (about 1¾ inch diameter in one embodiment). A resilient seal 42 is positioned on the shoulder 40 for sealing against pressurized cans inverted and inserted into the elongated cavity from the first end 30.

The puncturing apparatus 18 comprises a pivotal, angular lever 44 which is pivotally mounted to the elongated housing member 16 near the first end 30 thereof by a pivot pin 46. In this regard, the lever 44 has a lever stop surface 48 thereon which impinges on a housing member stop surface 50 to prevent the lever 44 from pivoting about the pivot pin 46 outwardly, away from the housing member 16, further than a particular angle. The lever 44 has a grip 52 at an outer end thereof with which an operator can rotate the lever 44 about the pivot pin 46. A pivoted link 54, comprised of to parallel slats, is pivotally coupled to the lever 44 at one end and to a puncture pin 56 at the other end. A free end of the puncture pin 56 has a pointed tip 58 and slides in the intermediate aperture 34. A pair of 0-rings 59 on the puncture pin provides a seal between the intermediate aperture 34 and the puncture pin 56. An area of the pin between the 0-rings is cut out and greased to provide self lubricating with each stroke of the puncture pin. A coiled spring 60 surrounding the puncture pin 56, externally of the housing member 16, presses between a tubular protrusion 62 of the elongated housing member 16 and a stop 64 of the puncture pin 56, thereby urging the puncture pin 56 outwardly, so as to be withdrawn from the elongated cavity 24. The particular angle at which stop surfaces 48 and 50 prevent the lever 44 from further outward pivoting is such that the O-ring seal area of the puncture pin 56 remains in the intermediate aperture when the lever is stopped at this angle. By rotating the lever 44 downwardly the coiled spring 60 can be overcome and the puncture pin 56 can be driven into the elongated cavity 24. As can be seen in FIG. 1, the tubular protrusion 62 surrounds the intermediate aperture 34.

Figure 2:
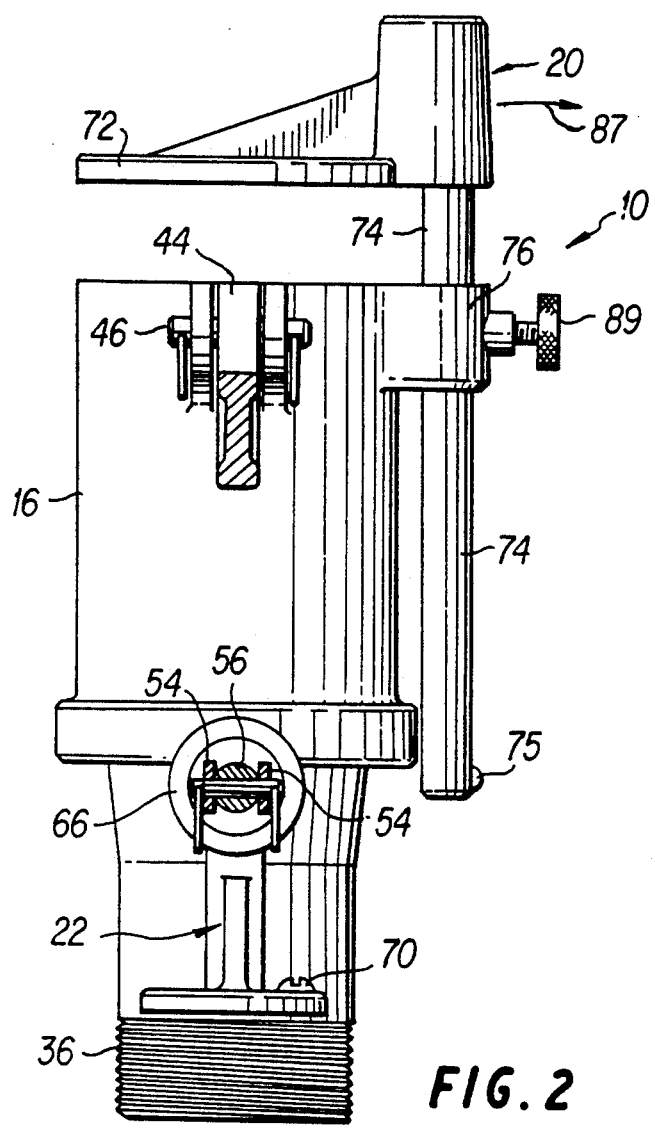
FIG. 2 is a sectional view taken on line II—II in FIG. 1.
Figure 3:
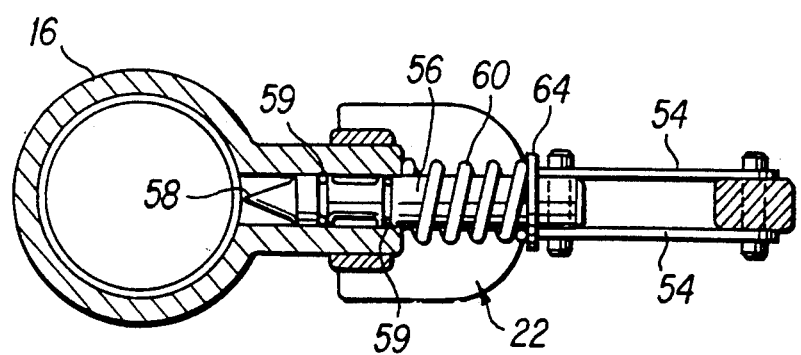
FIG. 3 is a sectional view taken on line III—III in FIG. 1.

The auxiliary support member 22 has a sleeve 66, which snugly surrounds the protrusion 62 to be easily rotatable thereabout, and a foot 68. The auxiliary support member includes a grounding screw 70 (FIG. 2) to which an electrical wire can be attached. It should be noted that the foot 68 is spaced immediately adjacent, or just a little above, the threads of the threaded terminus 36 of the elongated housing member 16 when the auxiliary support member is rotated so that the foot 68 thereof is directed toward the second end 32.

The force-applying apparatus 20 comprises a plate 72 which is affixed to a shaft 74 which, in turn, is slidably mounted in a sleeve 76 formed on the outside of the elongated housing member 16. Thus, the plate 72 can be rotated into and out of alignment with the first opening 26 of the elongated housing member 16 as well as moved toward and away from the first opening 26. The shaft 74 has a stop 75 thereon to prevent its removal from the sleeve 76. The plate 72 has an indentation 72a thereon with a flat floor surface 72b for receiving the bottoms of inverted pressurized containers.

The device 10 can be constructed of various materials, however, in a preferred embodiment, the housing member 16, the lever 44, the plate 72 and the auxiliary support member 22 are formed of aluminum so that they are light in weight, with the seal 42 and O-ring 59 being of elastomeric materials. In a preferred embodiment, the puncture pin 56, the pivoted link 54, the pivot pins and clips are of stainless steel. Also, in a preferred embodiment the pointed tip 58 of the puncture pin 56 is of carbide steel or of some other non-sparking alloy, to prevent sparking and thereby promote safety.

In operation, the device 10 is mounted on a common off-the-shelf drum 38 (typically a 55 gal. or 30 gal. drum) by screwing the threaded terminus 36 of the elongated housing member 16 into the normal female threaded, 2 inch, filling bung opening 77 of the drum.

While screwing the threaded terminus 36 into the drum, the auxiliary support member, 22 is rotated upwardly about the tubular protrusion 62 to be out of the way so as to cause the least amount of wear on the bung threads of the drum as is depicted in dashed lines in FIG. 4. The auxiliary support member 22 is only rotated downwardly on the final rotation of installation such that the foot 68 impinges on a protruding peripheral rim 79 of the drum. Thus, the auxiliary support member 22 is wedged between the rim 79 of the drum and the tubular protrusion 62 of the housing member 16.

A filter 80, which can be part of a kit including the puncturing device, is mounted in the normal ¾ inch vent opening 78 of the drum 38 for filtering escaping propellent gases and collecting gaseous vapors thereof.

The plate 72 of the force-applying apparatus 20 is lifted and rotated away from the first opening 26 and a pressurized container 12 is inverted and a dome, or neck, 82 thereof is inserted into the first opening 26. A shoulder 84 of the neck 82 comes into contact with the seal 42 on the shoulder 40 of the elongated housing member 16 and forms a seal therewith. The plate 72 is rotated above the first opening 26 and slid to impinge on an upwardly-facing bottom 86 of the pressurized container 12 to thereby force the shoulder 84 of the container 12 against the seal 42 of the elongated housing member 16 and thereby form a seal between these two members. The plate 72, which can be made of a heavier weight material, maintains this position, because upward force applied thereto tends to rotate the shaft 74 in a direction indicated by arrow 87 (FIG. 2) which binds it in the sleeve 76. In addition, in one embodiment the sleeve 76 has a threaded set-screw hole therein for receiving a knobbed set-screw 89 to impinge on the shaft 74. When the set-screw 89 is tightened it holds the plate 72 even more firmly in a fixed position. Finally, many operators prefer to simply hold the plate 72 against a can by hand, because this is the quickest method of operation. The plate 72 flattens on a bottom surface of the pressurized container 12, thereby straightening the container 12 so that a good seal is formed between the seal 42 and the container's neck 82.

Thereafter, the grip 52 of the lever 44 is manipulated to rotate the lever 44 downwardly toward the elongated housing member 16 thereby driving the puncture pin 56 through the intermediate aperture 34 into the dome, or neck, 82 of the pressurized container 12. Pressure in the thusly punctured pressurized container 12 forces gases and residue material from the container through the second opening 28 into the drum 38 to which the elongated housing member 16 is screwed. Propellants and other gases escape through the filter 80 and are thereby filtered, with gaseous vapors being collected.

FIG. 6 discloses an alternate embodiment of this invention in which a lever 44a is shaped and mounted quite differently than described above to an elongated housing member 16a. In this regard, a separate stop threaded bolt 88 is attached to the elongated housing member 16a with nuts 90 and 92 thereon to form stops. In this embodiment, the pivoted link 54 is not needed. Further, in this embodiment, there is no auxiliary support member 22. A plate 72a is not affixed to a shaft 74a, but rather is slidably connected thereon and the shaft 74a is affixed to the elongated housing member 16a. In this embodiment, a puncture pin 56a does not have an O-ring mounted thereon, but rather packing material is held about the puncture pin in a tubular protrusion 62a by a screwed-in plug 94. Otherwise, the embodiment of FIG. 6 operates substantially the same as does the embodiment of FIGS. 1-5.

It can be appreciated by those of ordinary skill in the art that the device for puncturing a pressurized container of this invention does not require a power source and can be located indoors or outdoors with no consideration for access to electricity or other power sources.

Also, the device of this invention can be directly attached to existing off-the-shelf collection containers or receptacles for collection of residual contents. That is, since the threaded terminus of the elongated housing member is sized to engage bung threads of typical storage drums, the invention can be easily transported without consideration for transporting large containers and can be inexpensively manufactured. It should be understood that although the device has been described herein to be mounted on drums standard in the United States, it could be sized to drum standards in any country.

Yet another benefit of this invention is that it accommodates most sizes of aerosol cans. Regardless of can diameters or lengths, the internal support shoulder of the elongated housing member is positioned and sized such that each inverted dome of an aerosol can is punctured at exactly the same spot as those of other cans. Conversely, this invention cannot be used to puncture a can with its nozzle-end, or dome-end, up. This is a safety feature, because the flat bottom of a container does not maximize evacuation of liquid residuals as does the funnel-shaped dome-end.

It is beneficial, however, that, although an aerosol can is punctured at its downwardly-facing nozzle-end, it is punctured from the side rather than from the end. This also enhances safety, because any force from released, compressed gas moves the can against an opposite side of the housing member rather than upwardly. This is important for protecting an operator who might forget to properly place the plate 72.

This invention is portable, lightweight and inexpensive, all features which facilitate compliance with regulations within a manufacturing plant. That is, the invention can be located at each "work center" at the convenience of workers, rather than in one centralized location which is where a large expensive machine would typically be located. That is, if a facility employs expensive machines, it is not economical to have many such machines spread out through the facility. However, manufacturing facilities have, in addition to their normal production line, maintenance shops where many aerosol cans are used, such as pump shops, machine shops, electrical shops, HVAC shops, maintenance shops etc.

Not only does this invention allow pressurized cans to be brought to "atmospheric pressure" prior to disposal, it also increases opportunities for recycling the cans. That is, aerosol cans which often contain chemicals will not be accepted by recyclers unless relieved of pressure. The 3 billion aerosol cans annually used in the US today amount to 375,000 tons of steel.

The lever operation of the device of this invention allows workers to easily puncture cans without endangering themselves, since compressed fluids are maintained in sealed portions of the elongated housing member, and workers are not in direct contact with the cans when they are punctured.

This invention facilitates the filtering of gases released from aerosol cans since filters can be relatively easily mounted to vent bung ports of standard drums.

Further, the device of this invention can be easily disassembled for required maintenance such as replacing pins or seals.

The auxiliary support member of this invention improves its operation by dissipating downwardly applied forces to a rim of the receptacle, which is usually the strongest part of the receptacle. Thus, the auxiliary support member protects an area around a bung opening of a drum. Further, because the rim height relative to the bung varies slightly from one receptacle to another, the auxiliary support member can be rotated downwardly against the rim at different revolutions of the elongated housing member during installation, a rounded rim of the foot providing contact for an additional half turn of the elongated housing member for adjustment.

Further, the auxiliary support member facilitates the electrical grounding of a drum, which is required by some governmental agencies, to prevent build-up of static electricity. By providing a grounding screw on the auxiliary support member, such grounding can be easily accomplished.

Since the auxiliary support member is rotatable about the tubular protrusion surrounding the intermediate aperture, it does not get in the way during mounting of the elongated housing member on the drum and it can be easily installed during the last rotation of the elongated housing member. The auxiliary support member ensures that relatively little stress is applied against the collection receptacle's threaded opening while allowing adjustment to different rim heights.

By placing O-rings in grooves of the puncture pin, fluid-tightness can be achieved with little effort. The recessed area between O-rings can be lubricated with grease so that the puncture pin is self-lubricated during use.

While the invention has been particularly shown and described with reference to preferred embodiments, it will be understood by those skilled in the art that various changes in form and detail may be made therein without departing from the spirit and scope of the invention.

The embodiments of the invention, in which an exclusive property or privilege are claimed, are defined as follows:

1. A device for puncturing a pressurized container for relieving the pressure therein and for releasing the residual contents thereof into a drum of a type having an end wall with a surrounding protruding peripheral rim, said device comprising:
    a generally elongated housing member defining an elongated cavity with openings at first and second ends thereof for receiving a pressurized container at said first end and further including an attachment means for securing said second end of said housing member to said end wall of said drum for collection by said drum of contents expelled from said pressurized container through said second end;
    a puncturing means mounted on said housing member intermediate said first and second ends for piercing said pressurized container in said elongated cavity whereby gases and residual contents thereof are emptied into said drum through said opening at said second end;
    said device further including an auxiliary support means for extending from said housing member to said protruding peripheral rim of said drum for stabilizing relative movement between said housing member and said drum during operation of said device.

2. A device as in claim 1 wherein said attachment means is a threaded terminus of said elongated housing member for engaging threads of said end wall of said drum.

3. A device as in claim 2 wherein said auxiliary support means is rotatable on said elongated housing member.

4. A device as in claim 3 wherein said auxiliary support means is rotatable about a tubular protrusion of said housing member which defines an intermediate aperture.

5. A device as in claim 4 wherein is further included a force-applying means movably mounted on said housing member for engaging said pressurized container positioned in said elongated cavity and forcing said pressurized container towards said second end.

6. A device as in claim 5 wherein said force-applying means comprises a plate affixed to a shaft which is slidably mounted on said housing member.

7. A device as in claim 4 wherein said puncturing means comprises a puncturing pin extending into said intermediate housing aperture, said puncturing pin including a spring for urging said pin out of said elongated cavity and a lever, pivotally mounted on the outside of said housing member, which is coupled to said pin via a pivoted link, for driving said pin into said elongated cavity.

8. A device as in claim 1 wherein is further included a force-applying means movably mounted on said housing member for engaging said pressurized container positioned in said elongated cavity and forcing said pressurized container towards said second end.

9. A device as in claim 8 wherein said force-applying means comprises a plate affixed to a shaft which is slidably mounted on said housing member.

10. A device as in claim 1 wherein said puncturing means comprises a puncturing pin extending into an intermediate housing aperture, said pin including a spring for urging said pin out of said elongated cavity and a lever, pivotally mounted on the outside of said housing member, which is coupled to said pin via a pivoted link, for driving said pin into said elongated cavity.

11. A device for puncturing a pressurized container for relieving the pressure therein and for releasing the gases and residual contents thereof into a collection receptacle, said device comprising:
    a generally elongated housing member defining an elongated cavity with openings at first and second ends thereof for receiving a pressurized container at said first end and further including an attachment means for securing said second end of said housing member to said receptacle for collecting contents expelled from said pressurized container through said second end;
    a puncturing means mounted on said housing member intermediate said first and second ends for piercing said pressurized container whereby gases and residual contents thereof are emptied into said collection receptacle through said opening at said second end;
    said device further comprising a force-applying means movably mounted on said housing member for engaging said pressurized container positioned in said elongated cavity and forcing said pressurized container towards said second end, wherein said force-applying means comprises a plate affixed to a shaft which is slidably mounted on said housing member.

12. A device as in claim 11 wherein said shaft binds relative to said housing member in response to a force by said pressurized container against said plate, thereby resisting movement of said plate relative to said housing member.

13. A device as in claim 11 wherein is further included a set-screw on said housing member for selectively engaging said shaft for holding said plate in a desired position.

14. A device as in claim 11 wherein a pointed tip of said puncturing means is of a non-sparking metal.

15. A device as in claim 14 wherein said non-sparking metal is carbide steel.

16. A device as in claim 11 wherein a portion of said puncturing means extends through an intermediate housing aperture having a seal mounted thereon for forming a seal with a portion of said elongated housing member defining said intermediate aperture.

17. In a device for puncturing a pressurized container for relieving the pressure therein and for releasing for collection in a receptacle residual contents thereof, the improvement wherein:

said device comprises a generally elongated housing member defining an elongated cavity with openings at first and second ends thereof for receiving a pressurized container therein at said first end and further including an attachment means for selectively securing said second end of said housing member to a receptacle for collecting contents expelled from said second end and for supporting said housing; and a puncturing means mounted on said housing member intermediate said first and second ends for piercing said pressurized container in said cavity whereby gases and residual contents thereof are emptied into said collection receptacle through said opening at said second end;

wherein said housing member defines an internal shoulder within said elongated cavity between said puncturing means and said first end whereby said pressurized container can be inserted into said first end in an inverted attitude with an external shoulder thereof engaging said internal shoulder, with a portion thereof extending below said shoulder means to be punctured by said puncturing means.

18. A device as in claim 17 wherein a resilient seal is included at said internal shoulder.

19. A device as in claim 17 wherein the elongated housing member is substantially straight.

20. A device as in claim 19 wherein the attachment means comprises male threads at said second end of said elongated housing member for engaging threaded openings of storage drums.

21. A device as in claim 17 wherein the attachment means comprises male threads at said second end of said elongated housing member for engaging standard threaded openings of storage drums.

22. A device as in claim 17 wherein said housing member has an intermediate aperture into said elongated cavity intermediate said first and second ends and wherein said puncturing means is movably mounted on said housing member for extending through said aperture and piercing said pressurized container below said shoulder means.

23. In a device for puncturing a pressurized container for relieving the pressure therein and for releasing for collection in a receptacle residual contents thereof, the improvement comprising a generally elongated housing member defining an elongated cavity with openings at first and second ends thereof for receiving a pressurized container therein at said first end and further including an attachment means for selectively securing said second end of said housing member to a receptacle for collecting contents expelled from said second end and for supporting said housing; and a puncturing means mounted on said housing member intermediate said first and second ends for piercing said pressurized container in said cavity whereby gases and residual contents thereof are emptied into said collection receptacle through said opening at said second end;

wherein the attachment means comprises male threads at said second end of said elongated housing member for engaging standard threaded openings of storage drums.

24. A device as in claim 23 wherein the elongated housing member is substantially straight.

25. A device as in claim 23 wherein said housing member has an intermediate aperture into said elongated cavity intermediate said first and second ends and wherein said puncturing means is movably mounted on said housing member for extending through said aperture and piercing said pressurized container.

26. A device as in claim 23 wherein said receptacle is a drum and wherein said device further includes an auxiliary support means for extending from said housing member to a peripheral rim of said drum for stabilizing relative movement between said housing member and said drum during operation of said device.

* * * * *